United States Patent [19]

Ekstrom, Jr.

[11] Patent Number: 4,529,869
[45] Date of Patent: Jul. 16, 1985

[54] INSTRUMENT FOR INDUCING HEAT INTO AN ELONGATED OBJECT WHOSE TEMPERATURE IS TO BE MEASURED

[76] Inventor: R. A. Ekstrom, Jr., 15555 Millard Ave., Markaham, Ill. 60426

[21] Appl. No.: 291,325

[22] Filed: Aug. 10, 1981

Related U.S. Application Data

[63] Continuation-in-part of Ser. No. 108,654, Dec. 31, 1979, abandoned.

[51] Int. Cl.³ ............................................. H05B 3/58
[52] U.S. Cl. .................................... 219/535; 219/530; 219/541; 374/180
[58] Field of Search ................. 73/1 F, 343 R, 359 R; 219/230, 243, 300, 469, 470, 471, 530, 535, 540, 541; 374/141, 147, 179, 180; 338/49, 235, 322

[56] References Cited

U.S. PATENT DOCUMENTS

| | | | |
|---|---|---|---|
| 2,141,759 | 12/1938 | Moffat | 374/141 X |
| 2,474,147 | 6/1949 | Hill | 219/535 |
| 2,625,643 | 1/1953 | Cordis | 219/535 |
| 2,737,050 | 3/1956 | Moninger | 374/147 |
| 2,740,035 | 3/1956 | Young, Jr. | 219/535 |
| 2,854,844 | 10/1958 | Howell | 137/246 |
| 3,067,604 | 12/1962 | Brunson | 374/1 |
| 3,105,136 | 9/1963 | Ashentarb | 219/300 |
| 3,151,484 | 10/1964 | Feehan et al. | 374/179 X |
| 3,231,716 | 1/1966 | van den Bosch | 219/535 |
| 3,423,570 | 1/1969 | Trabilcy | 219/535 X |
| 4,121,460 | 10/1978 | Ekstrom, Jr. | 374/180 |

Primary Examiner—Volodymyr Y. Mayewsky
Attorney, Agent, or Firm—Lee, Smith & Zickert

[57] ABSTRACT

This disclosure relates to a portable instrument for inducing heat into an object. The instrument includes an enclosure that fastens to and at least partially encloses the object, an electrical power source fastened to the enclosure and including a variable power supply for passing heating current through the enclosure and thereby heating the object, and a thermocouple for sensing the temperature of the object.

20 Claims, 20 Drawing Figures

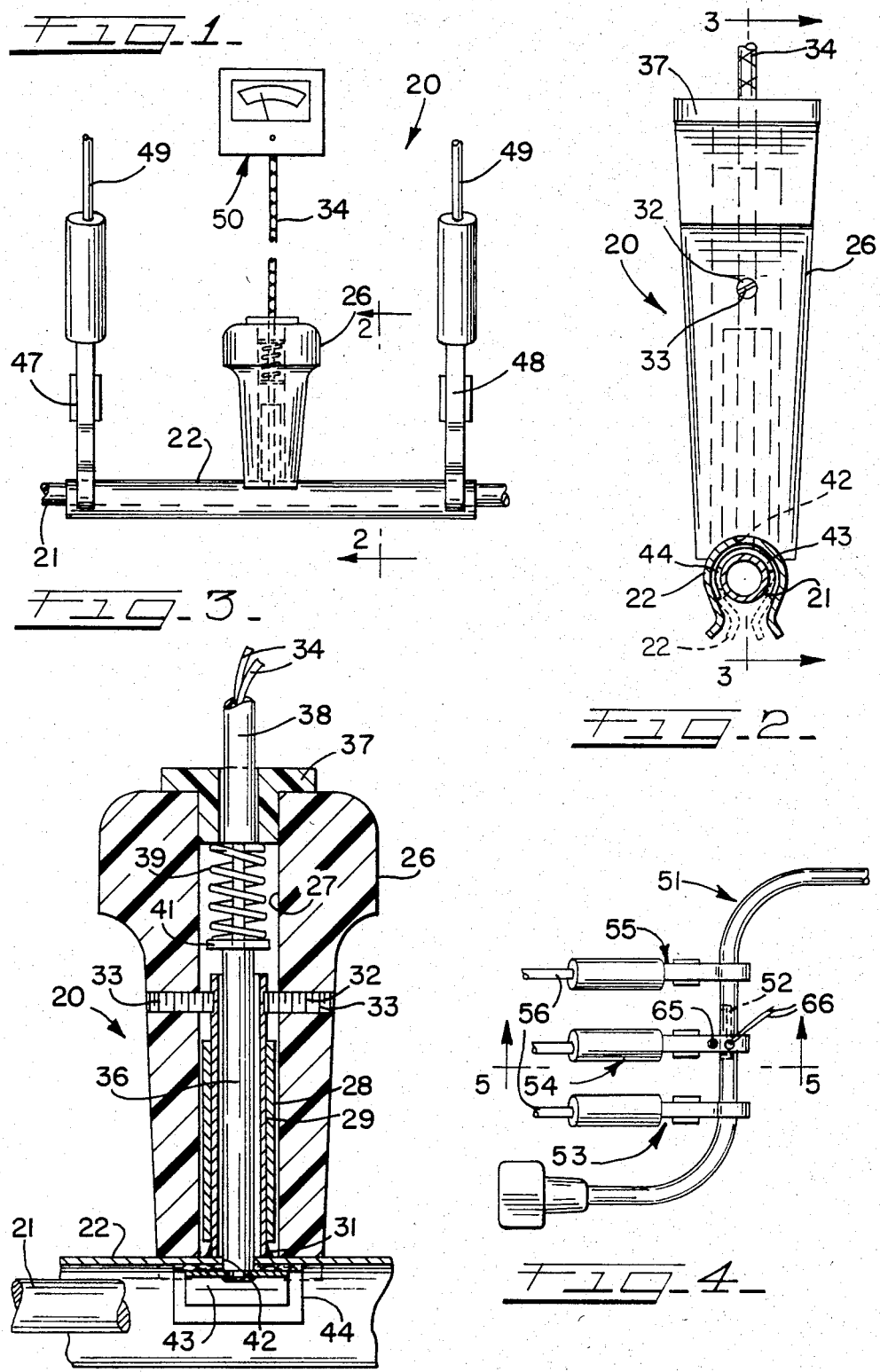

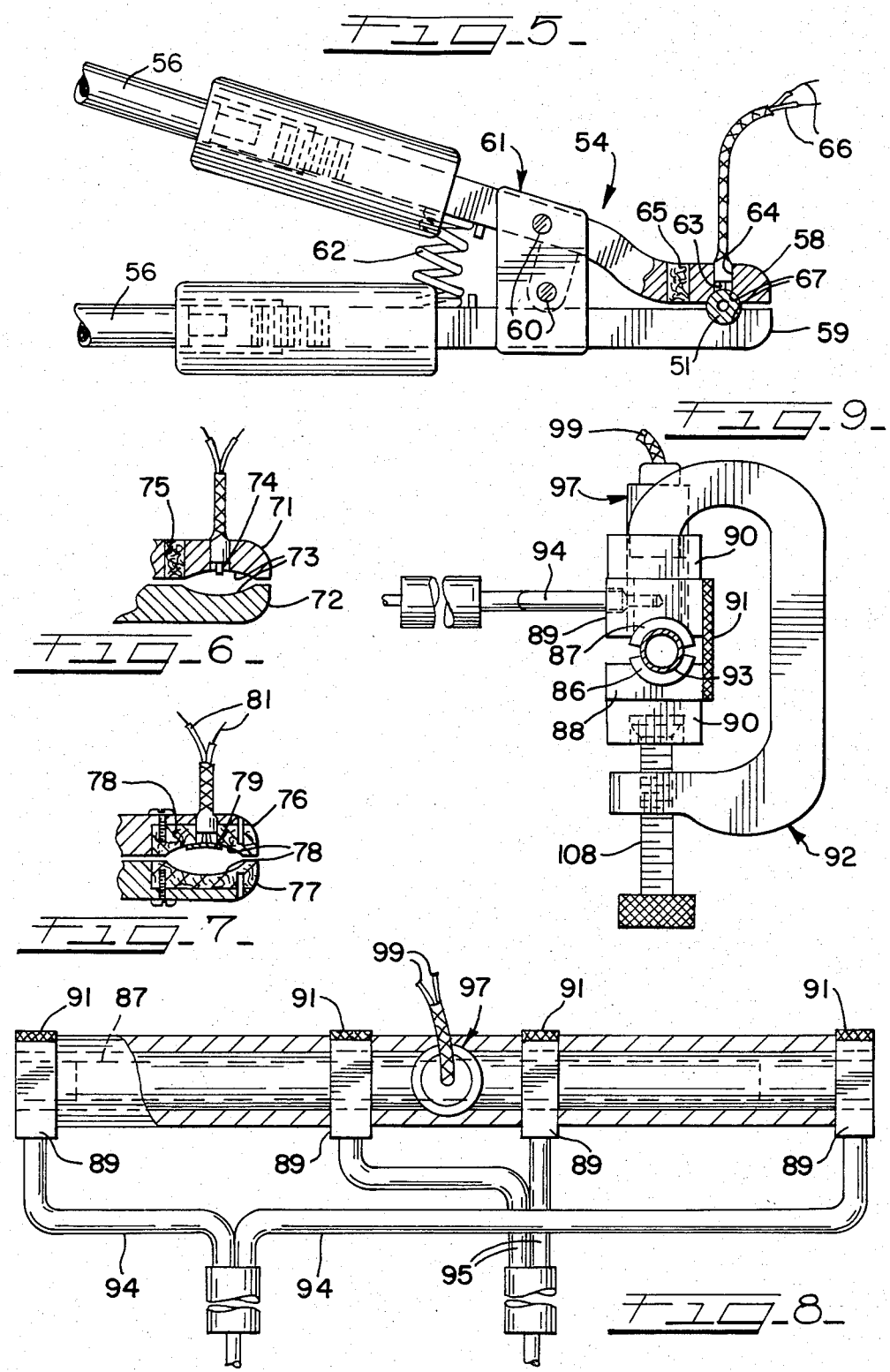

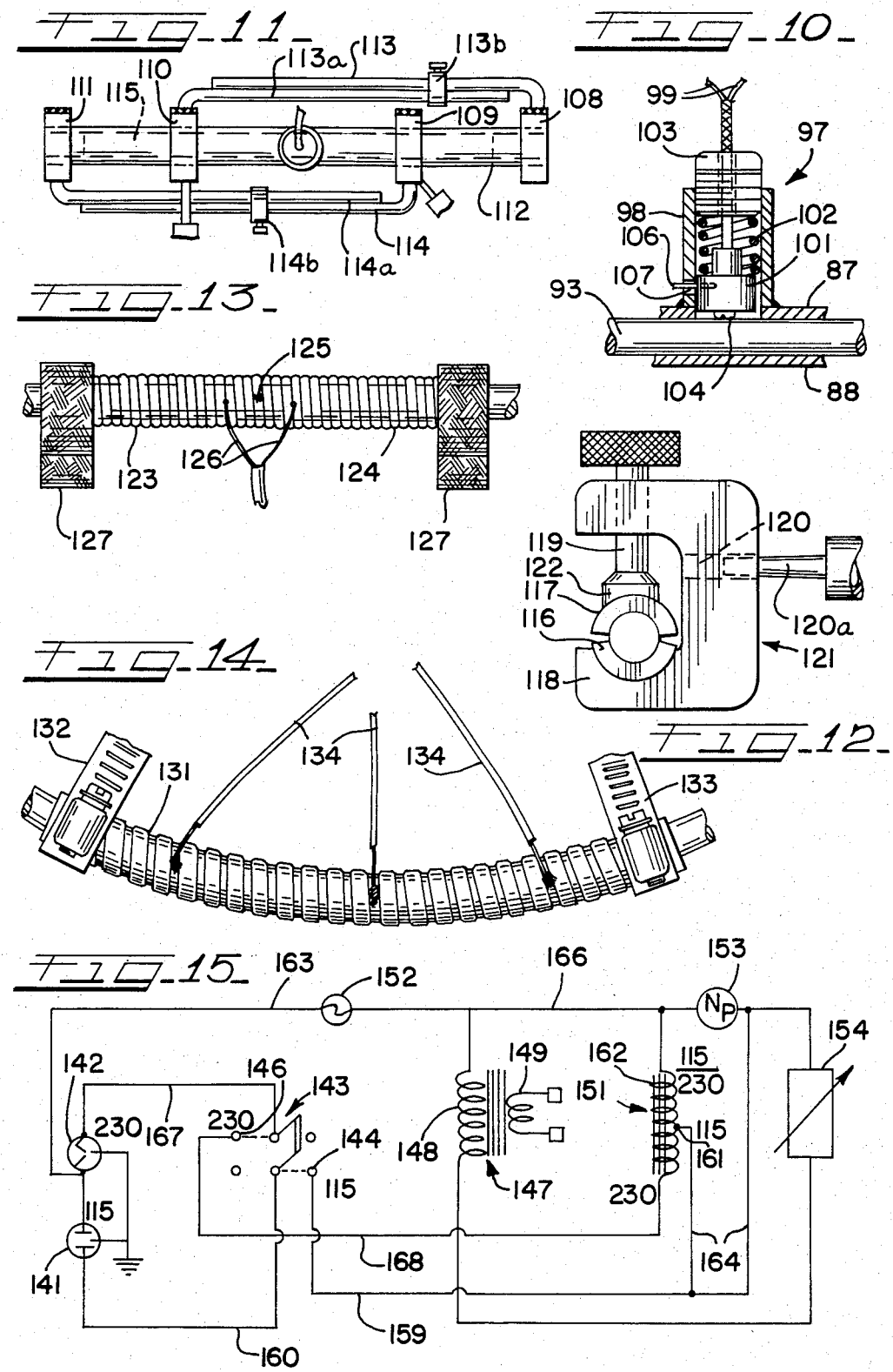

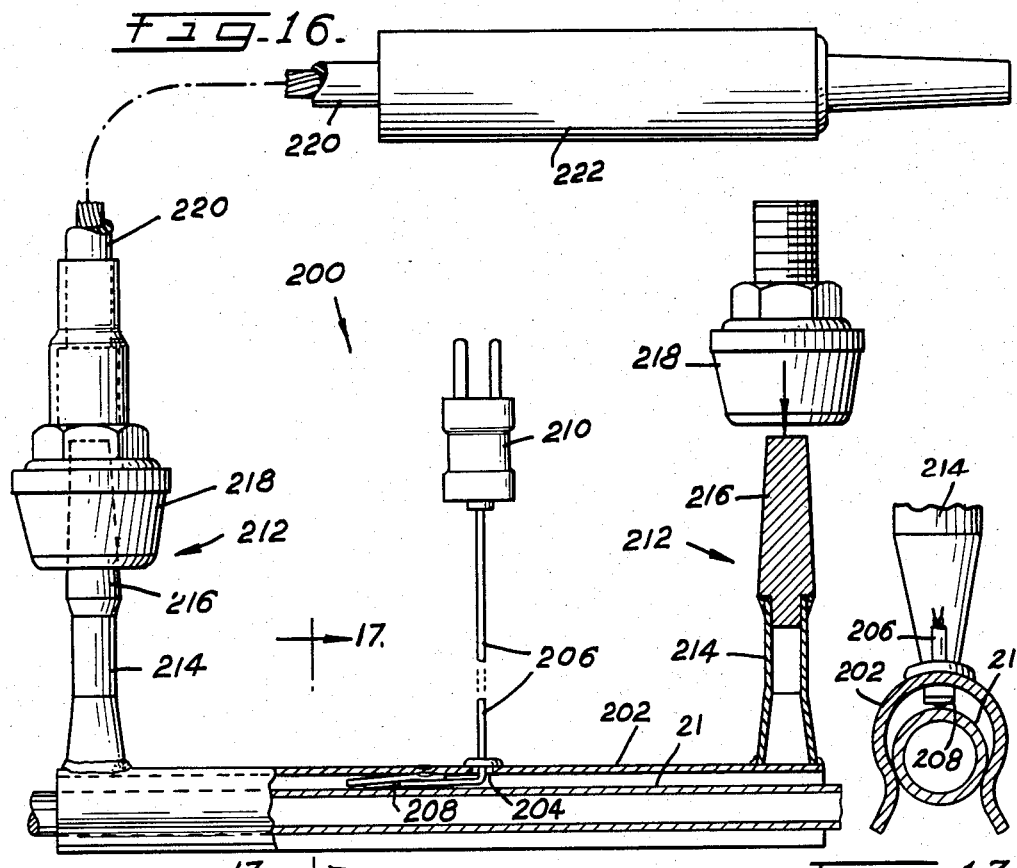

INSTRUMENT FOR INDUCING HEAT INTO AN ELONGATED OBJECT WHOSE TEMPERATURE IS TO BE MEASURED

RELATED APPLICATION

This application is a continuation-in-part of my U.S. patent application Ser. No. 108,654, filed Dec. 31, 1979, now abandoned.

BACKGROUND OF THE INVENTION

R. E. Ekstrom U.S. Pat. No. 4,121,460 describes an instrument designed to measure the temperature of a device such as a thermometer bulb, a Calrod heating element, etc. The instrument includes a housing adapted to enclose the device and temperature responsive parts within the housing that engage the device and sense its temperature.

In addition to the above Ekstrom patent, Howell U.S. Pat. No. 2,854,844 discloses a portable test unit for a thermometer bulb wherein the bulb is placed in a heated enclosure. The enclosure is heated by a resistance wire heater and a variable power source. A metal heat conductive sleeve encloses the bulb, and in one arrangement shown in the patent, a thermocouple engages the sleeve. The patent also makes a reference to obtaining an accurate average temperature reading. Evans' U.S. Pat. No. 2,658,380 also shows a portable test unit including a built-in heater.

The following U.S. patents were cited as references in the Ekstrom U.S. Pat. No. 4,121,460 and may be considered pertinent: U.S. Pat. Nos. 1,762,859, 2,694,313, 3,134,008, 3,155,237, 3,757,207 and 3,797,310.

A goal not adequately reached by the instruments described in the foregoing patents is that of a portable instrument capable of quickly and accurately measuring the temperature of an elongated object and adaptable to use with objects of a variety of sizes and designs.

It is accordingly a general object of the present invention to provide a novel and improved test instrument that serves the foregoing needs.

SUMMARY OF THE INVENTION

An instrument in accordance with the present invention comprises enclosure means fastened to and at least partially enclosing an elongated object whose temperature is to be measured, power terminal means fastened to said enclosure means, a power supply connected to said power terminal means for supplying heating current to said terminal means and to said enclosure means and thereby heating said enclosure means and said object, and thermocouple means on said power terminal means and said enclosure means for sensing the temperature of said object.

The foregoing and other objects and advantages of the present invention will be better understood from the following detailed description taken in conjunction with the accompanying figures of the drawings, wherein:

BRIEF DESCRIPTION OF THE DRAWINGS

FIG. 1 is a drawing showing a preferred form of the invention;

FIG. 2 is an enlarged sectional view taken on the line 2—2 of FIG. 1;

FIG. 3 is a further enlarged sectional view taken on the line 3—3 of FIG. 2;

FIG. 4 is a drawing of an alternate form of the invention;

FIG. 5 is an enlarged sectional view taken on the line 5—5 of FIG. 4, with the thermostat omitted for purposes of clarity;

FIGS. 6 and 7 are fragmentary views of an alternate construction of a part of the apparatus shown in FIGS. 4 and 5;

FIG. 8 is a view of another alternate form of the invention;

FIG. 9 is an enlarged view showing the apparatus of FIG. 8 assembled with an object being tested;

FIG. 10 is an enlarged sectional view showing the apparatus for mounting a thermocouple on the instrument shown in FIGS. 8 and 9.

FIG. 11 is similar to FIG. 8, but shows an alternate means for connecting power to the instrument parts;

FIG. 12 shows an alternate means for fastening an enclosure of the instrument to an object being tested;

FIGS. 13 and 14 are views of still other alternate forms of the invention;

FIG. 15 is schematic diagram of an electric power supply for the instruments disclosed herein;

FIG. 16 is an elevational view, with portions in section, of an alternative form of the invention;

FIG. 17 is an enlarged sectional view taken on the line 17—17 of FIG. 16;

FIG. 18 is a side elevational view, with portions in section, of yet another alternate form of the invention;

FIG. 19 is a left end elevational view of the form of the invention shown in FIG. 18; and FIG. 20 is an exploded view of one of the heating elements of the form of the invention shown in FIG. 18.

DESCRIPTION OF THE PREFERRED EMBODIMENTS

With reference first to FIGS. 1 through 3, there is illustrated an instrument 20 for measuring the temperature of an elongated object 21, such as a rod, thermometer bulb, Calrod, etc. In the example illustrated, the object 21 is a tubular metal or glass thermometer bulb. The instrument 20 comprises a generally "U" shaped enclosure 22, the arms of the "U" being bowed inwardly as best shown in FIG. 2 and being separated by a distance that preferably is slightly less than the diameter of the object 21. Thus, the enclosure 22 may be clipped or fastened to the object 21 by placing the object in the opening of the "U" and then pressing the object 21 into the interior of the "U" shaped enclosure, the arms of course flexing apart.

As shown in FIG. 1, the enclosure 22 is generally elongated, and a handle 26 is secured to the outer surface of the enclosure 22 at approximately its mid-section. With reference to FIG. 3, the handle 26 has a round bore 27 formed through it and two concentric tubes 28 and 29 are mounted within the bore 27, the two tubes 28 and 29 being tightly connected. The tubes 28 and 29 extend downwardly to adjacent the lower end of the handle 26 and the tube 29 is soldered, as indicated at 31, to the outer surface of the enclosure 22. The outer tube 28 forms a spacer that prevents the tubes from wobbling in the bore 27. Threaded holes 32 are formed radially through the side of the handle 26 and set screws 33 are threaded through the holes 32 and secure the handle 26 to the tube 29. Thus, the enclosure 22, the two tubes 28 and 29 and the handle 26 are tightly fastened together. Also extending through the bore 27 are two thermocouple wires 34, which extend through the centers of the two tubes 28 and 29. A third innermost tube 36, made of porcelain in this specific example, is movably mounted within the tube 29 and the two wires 34 extend through and are movable with the innermost tube 36. A plug or cap 37 fits in the upper opening of the bore 27 at the upper end of the handle 26 and is secured to the handle as by a press fit, and the wires 34, which are encased in a sleeve 38, pass through a central opening in the plug 37. A compression spring 39 is mounted between the lower side of the plug 37 and a flange 41 that is seated on the upper end of the innermost tube 36, and it will be apparent that the compression spring 39 urges the innermost tube 36 downwardly relative to the handle 26 and the enclosure 22.

Around the lowermost end of the tube 36, a hole 42 is formed through the enclosure 22, through which the innermost tube 36 and the lower ends of the thermocouple wires 34 extend. A metal thermocouple contact plate 43 is fastened, as by soldering, to the thermocouple wires 34, and a thin layer of insulation 44, such as mica, is positioned between the contact plate 43 and the enclosure 22. As shown best in FIG. 2, both the contact plate 43 and the insulation layer 44 are bent to a semi-circular configuration and conform to the inner curvature of the enclosure 22. The curvature of the enclosure 22 and the plate 43 is preferably shaped to conform closely to the curvature of the outer surface of the object 21, as shown in FIG. 2.

With reference again to FIG. 1, the enclosure 22 and the object 21 are heated by passing current through the enclosure 22. While power leads may be permanently secured to the end portions of the enclosure 22, in the present instance a pair of spaced power clips 47 and 48 are fastened to the enclosure 22, the two clips 47 and 48 preferably being located adjacent the ends of the enclosure 22 and an opposite sides of the handle 26. The two power clips 47 and 48 include power leads 49 that are connected to a variable power supply, such as the arrangement to be described in connection with FIG. 15. It should also be noted that the thermocouple contact plate 43 is connected by the thermocouple wires 34 to a meter 50 that preferably has a scale calibrated to show the temperature of the contact plate 43.

Normally the spring 39 urges the innermost tube 36 and the contact plate 43 downwardly as seen in FIG. 3, the flange 41 being pressed into engagement with the upper end of the tube 29. To measure the temperature of the object 21, a technician fastens the instrument to the object 21 by grasping the handle 26, placing the opening of the "U" shaped enclosure 22 over the object 21 and pressing on the handle 26 to push the enclosure 22 over the object 21. The pressure of the object 21 as it moves into the interior of the enclosure 22 moves the contact plate 43 and the tube 36 upwardly to the position shown in FIG. 3, but of course the compression spring 39 holds the thermocouple contact plate 43 firmly in engagement with the object 21. The power supply connected to the wires 49 is then energized to supply power current to the clips 47 and 48. The power current flows through the clips 47 and 48 and along the length of the enclosure 22, and the enclosure 22 has sufficient electrical resistance that it self heats by resistance heating. To this end, the enclosure 22 may be made, for example, of number 304 stainless steel. As the enclosure 22 is heated by the current passing through it, it heats the object 21 and the enclosure causes the heat to be retained within the enclosure and around the object 21. Since the object 21 and the enclosure 22 are relatively elongated and the thermocouple is at approximately the center of the long enclosure, the portion of the object 21 around the thermocouple is relatively uniform. Consequently, the temperature of the thermocouple, as indicated by the meter 50, is an accurate indication of the average temperature of the object 21. As previously mentioned, in the specific example being described, the object 21 is the bulb of a thermometer scale (not shown). The accuracy of the thermometer may therefore be checked by comparing the meter 50 reading with the temperature indicated by the thermometer. The arrangement shown in FIGS. 1 to 3 is highly advantageous when used with an elongated thermometer bulb because it can enclose all or substantially all of the bulb and thereby ensure an accurate temperature reading. Nevertheless, the instrument may also be used to measure the temperature of a Calrod, a tube packed with a compound to be heated to a certain temperature, etc. Similarly, while the arrangement shown in FIG. 4 is shown in connection with a Calrod, it could instead be used with a metal thermometer bulb or other object.

In the form of the invention illustrated in FIGS. 4 and 5, the enclosure is formed by the tube of a Calrod heating element 51 having an in-built temperature control thermostat shown by the dashed lines and indicated by the numeral 52. The thermostat 52 is normally connected in the power circuit of the Calrod and controls the temperature of the Calrod. The instrument comprises, in this instance, three power clips 53, 54 and 55, the clips 53 and 55 being connected to a variable power supply and the clip 54 housing a thermocouple connected to a pyrometer. Power leads 56 connect the clips to the power supply. As shown in FIG. 4, the center clip 54 is located adjacent the thermostat 52.

The center clip 54 is better shown in FIG. 5 and has a thermocouple contact built into it. The power clip 54 includes two jaws 58 and 59 which are hinged together at 61, and a spring 62 urges the jaws 58 and 59 together so as to tightly clamp the rod 51. The jaw 58 has a hole 64 formed through it and thermocouple wires 66 extend through the hole 64. The lower ends of the wires 66 appear at the inner side of the jaw 58 and form a thermocouple junction 63. The jaws 58 and 59 are preferably grooved on their inner sides as indicated at 67, the grooves 67 preferably conforming to the curvature of the rod 51 so as to accurately locate the rod 51 in the position to be engaged by the thermocouple junction 63. The wires 66, of course, are connected to a meter such as the meter 50 which indicates the temperature at the junction 63.

To reduce the loss of heat from the rod 51 through the upper jaw 58, a heat dam is formed on this jaw by removing, as by drilling, part of the jaw to form a hole 65 and filling the hole with a material such as asbestos. The resulting reduction in the cross section of the jaw adjacent the hole 65 reduces the heat loss as mentioned and produces a more accurate reading. The hinge 61 for the jaws includes two pivot holes 60, and a screw is mounted in one or the other of the two holes. The selected hole thus forms a fulcrum, and the jaws pivot differently for the two fulcrums.

To test the accuracy of the thermostat 52, the three clips 53, 54 and 55 are fastened to the rod 51 as shown in FIG. 4, the two clips 53 and 55 being spaced on opposite sides of the clip 54 and the thermostat 52. Electric power is connected to the leads 56 causing current to flow between the clips 53 and 55. Current can also flow through the clip 54 to obtain more uniform heating of the rod in the area of the thermostat 52. For example, the power clip 54 may be connected to the ground terminal of the power supply and the two terminals 53 and 55 may be connected to the positive terminal so that current flows between the center clip 54 and the two outer clips 53 and 55. The power current also flows through the rod 51 and it is heated by resistance heating as previously described in connection with the enclosure 22 in FIG. 1. The opening and closing temperatures of the thermostat 52 may be readily determined by observing the meter connected to the thermocouple wires 66 and by adjusting the power output of the supply connected to the wires 56 in order to vary the temperatures of the rod 51 and the thermostat 52.

FIGS. 6 and 7 are similar to FIG. 5, but show different constructions of the center clip having the thermocouple contact. In FIG. 6, the clip comprises two jaws 71 and 72, having grooves 73 formed therein, adapted to receive the object to be tested. To make the grooves adaptable to a range of sizes or shapes of the object to be tested, the grooves 73 are formed with relatively large diameters. A thermocouple contact 74 is mounted in a hole formed in the jaw 71 as shown in FIG. 5, and a heat dam is preferably formed by a hole 75 formed in the jaw 71 and filled with insulation.

In FIG. 7, the two jaws 76 and 77 of a power clip have grooves 78 formed therein generally similar to the grooves 73. To further retard heat loss and thereby improve accuracy, the inner sides of the jaws include insulating layers 78. The thermocouple is formed by a relatively wide strip or plate 79 that is soldered to two thermocouple wires 81. The plate 79 has a broad area in engagement with the object being tested and will thereby have greater assurance of being heated to the temperature of the object, but heat loss is retarded by the insulation 78.

In the arrangement illustrated in FIGS. 8 to 10, the enclosure is formed by a split tube or sleeve comprising halves 86 and 87. The lower half 86 is supported by four lower contact blocks 88 and the upper half 87 is supported by four upper contact blocks 89, the blocks 88 and 89 being arranged in pairs and each pair being hinged together along one side by a flexible braided cable 91. C-clamps 92 are connected to the contact blocks 88 and 89 for pressing the blocks and the halves 86 and 87 into tight engagement with a rod 93 whose temperature is to be measured. Power is connected to the halves 86 and 87 by a plurality of power leads 94 and 95. With reference to FIG. 8, the two outermost sets of blocks are connected to two leads 94 and the innermost set of blocks 89 are connected to the other two leads 95 so that, in the arrangement illustrated in FIG. 8, two power current paths are formed through the halves 86 and 87, both paths crossing the center area of the halves 86 and 87. As shown in FIG. 9, the leads 94 and 95 are attached to the upper blocks 89 and current flows from the blocks 89 to the half 87 and through the hinge cables 91 to the lower blocks 88 and to the half 86.

With reference to FIG. 10, a thermocouple 97 is mounted on the upper half 87 between the two centermost sets of the blocks 88 and 89. The thermocouple mount includes a tubular sleeve 98 that is mounted tangentially relative to the half 87 and secured thereto as by soldering. A pair of thermocouple wires 99 extend through the sleeve 98 and are fastened to an insulating support 101. A compression spring 102 is mounted between the support 101 and a plug 103 that is threaded into the outer end of the sleeve 98 so that the support 101 is urged downwardly by the spring 102 into engagement with the object 93. The thermocouple junction 104 at the ends of the wires 99 is at the lower end of the support 101 and in position to engage the object 93. A pin 106 is preferably attached to the support 101 and extends through a slot 107 formed in the wall of the sleeve 98 in order to hold the support in place within the sleeve 98. The thermocouple wires 99 are, of course, connected to a meter such as the meter 49 for indicating the temperature of the object 93.

To measure the temperature, the instrument is fastened to the rod 93 by positioning the halves 86 and 87 and the pairs of blocks 88 and 89 on opposite sides of the rod 93. To reduce heat loss through the C-clamps 92, pads 90 of an insulating material, such as Transite, are placed between the blocks 88 and 89 and the jaws of the clamp, and the pads are preferably attached to the jaws. The screws 108 of the clamps are then tightened to clamp the halves 86 and 87 tightly on the rod 93. Power is then connected to the leads 94 and 95 causing power current to flow through the blocks 88 and 89 and the two halves 86 and 87. The halves 86 and 87 are heated by resistance heating and, of course, some of the current may also flow through the rod 93 causing it to resistance heat also. Again, the thermocouple meter attached to the wire 99 indicates the temperature of the rod 93. The blocks 88 and 89 may be secured to the halves 86 and 87 for ease of handling, or they may be detachable so that the locations of the blocks on the halves may be adjusted to obtain the most uniform heating of the rod 93.

The arrangement illustrated in FIG. 11 is similar to that shown in FIGS. 8 through 10 except for the arrangement of the heating current paths. The arrangement shown in FIG. 11 also includes a pair of halves 112 which are clamped around a tube or other object 115 to measure its temperature, the instrument including four pairs of contact blocks 108 through 111, which are mounted along the length of the halves 112. The first and third blocks 108 and 110 are connected by rods 113 and 113a and a clamp 113b, and the second and fourth blocks 109 and 111 are connected by rods 114 and 114a and a clamp 114b. Power leads connect the blocks 109 and 110 to a power supply. One of the rods 113 and 113a and one of the rods 114 and 114a are made of a good conductor such as copper and the other rod of each pair is made of a poorer conductor such as a resistance alloy. The current transfers from one rod to the other of each pair at the associated clamp 113b and 114b, and the amount of current flowing to the blocks 108 and 111 may therefore be varied by adjusting the locations of the clamps 113b and 114b because of the difference in resistance of the rods. One current path is between the blocks 108 and 109 and the other path is between the blocks 110 and 111, and the center part of the tube 115 and the halves 112 is heated by heat conduction. The locations of the blocks 108 to 111 and the clamps 113b and 114b may be adjusted to obtain uniform heating. In both the arrangement shown in FIG. 8 and the arrangement shown in FIG. 11, the center area of the enclosure halves where the thermocouple is located, is relatively uniformly heated and therefore gives an accurate indication of the temperature of the object being tested.

In the arrangement shown in FIG. 12, two halves 116 and 117 of an enclosure are fastened respectively to an arm 118 and to a screw 119 of a C-clamp 121 as by soldering. The screw 119 has a swivel 122 fastened thereto which is connected to the half 117 so that the screw 119 may be turned without rotating the half 117. A cylindrical hole 120 is formed in a clamp 121 and a tapered plug 120a is pressed into the hole 120 in order to connect the clamp and the halves 116 and 117 to a power supply. The plug is of the type commonly used with electric welding equipment. A thermocouple arrangement and power supply may be similar to that described.

The arrangements shown in FIGS. 13 and 14 are readily adapted for measuring either straight objects or curved objects. In FIG. 13, an enclosure is formed by a tightly coiled spring-like member formed by two parts 123 and 124. The ends of the two parts are welded or soldered together as indicated at the point 125. The part 123 is made of one thermocouple material such as alumel and the other part 124 is made of a different thermocouple material such as chromel. The point 125 therefore forms a thermocouple junction, and wires 126 attached to the parts 123 and 124 connect the junction to a meter. The coiled parts 123 and 124 are slipped over a tube, rod, bulb, etc. to be tested. Connected to the ends of the parts 123 and 124 are, in the present example, a pair of woven wire cables 127, which are adapted to be connected to a variable power supply. When the cables 127 are connected to the power supply, current flows through the parts 123 and 124 and heats it by resistance heating, causing the portion of the tube adjacent the junction 125 to be uniformly heated.

In FIG. 14, the enclosure is formed by a flexible cabled sleeve known in the trade as Greenfield tubing. The tubing is formed by a coil having interlocked edges but which is still flexible as illustrated. The tubing 131 is fastened to adjustable clamps 132 and 133 located adjacent its ends, the two clamps being adapted to be attached to a power supply. In this form of the invention, three thermocouple wires are soldered at spaced points along the length of the tubing 131, and the three wires are connected to a meter. Any two of the three wires 134 may be connected to the meter at one time, and the meter will indicate the temperature of the portion of the tubing 131 between the selected pair of the wires 134. The portion of the tubing 131 between the selected pair of thermocouple wires thus forms part of the thermocouple circuit.

FIG. 15 illustrates a power supply for use in the various forms of the instrument, which is usable with either 115 volt or 230 volt power outlets. The power supply includes a 115 volt plug 141 and a 230 volt plug 142, which are connected to the opposite blades of a double pole switch 143. One pole 144 is for 115 volt operation and another pole 146 for 230 volt operation. The power supply further includes a power transformer 147 including a primary winding 148 and a secondary winding 149 which is adapted to be connected to the power clips, braided cables, etc. of the instrument. The secondary winding 149 of the transformer 147 supplies a low voltage, high amperage output regardless of whether the system is connected to a 115 volt supply or a 230 volt supply. The supply further includes an autotransformer 151, a fuse 152, a neon pilot light 153, and a voltage control device 154 such as a triac control.

Assuming that a 115 volt power outlet is available, the plug 141 is connected to the outlet and the blade of the switch 143 is connected to the pole 144. The power current flows through a line 160 leading from the plug 141 to the switch 143, the pole 144, a line 159 leading to the center tap 161 of the autotransformer 151, the upper section 162 of the transformer 151, lines 163 and 166 that are connected to the fuse 152 and to the plug 141. The center tap 161 of the transformer 151 is connected by lines 164 in series with the triac voltage control 154 and with the primary 148 of the power transformer 147, so that a control circuit path is formed through the section 162 of the transformer 151, the lines 164, the triac voltage control 154, the primary 148 and the line 166. The voltage control 154 is adjustable to vary the power output at the secondary winding 149.

On the other hand, if the 230 volt power outlet is available, the plug 142 is connected to the 230 volt outlet and the switch 143 blade is connected to the pole 146. The power current then flows from the plug 142 to the switch 143 by way of a line 167, the pole 146 and a line 168 to the autotransformer 151, the lines 166 and 163 and return of the plug 142. Again, 115 volts appears at the center tap 161, and the power available at the power clips may be adjusted as previously described.

FIGS. 16 and 17 illustrate an alternative embodiment of the form of invention shown in FIGS. 1 through 3. Illustrated is an instrument 200 for measuring the temperature of an elongated object 21. The instrument 200 comprises a generally U-shaped enclosure 202, the arms of which are bowed inwardly as shown in FIG. 17 so that the enclosure 202 may be clipped or fastened to the object 21 located therewithin. The elongated object 21 to be tested is of the same nature of that described above and therefore is not described in further detail.

The enclosure 202 includes a bore 204 through which wires 206 of a thermocouple sensor 208 pass for connection to a plug 210 which, in a normal fashion, can be connected to a meter (such as the meter 50 of FIG. 1) or other device having a scale calibrated to show the temperature registered by the thermocouple 208. As shown in FIGS. 16 and 17, the thermocouple 208 is located within the enclosure 202 so that the thermocouple 208 may directly contact the object being heated and whose temperature is to be determined.

Similar to the instrument 20 of FIGS. 1 through 3, the instrument 200 includes an electrical connector 212 located at opposite ends of the enclosure 202. Each of the connectors 212 comprises an electrical contact 214 firmly affixed to the enclosure 202, such as by silver soldering. The contact 214 has a plug portion 216 shaped to engage an electrical connector 218. The connector 218 in turn has a supply wire 220 which leads to a source of electrical current or, as shown in FIG. 16, may lead to another connector 222 which may be plugged into a source of electrical current (not illustrated).

Because the contacts 214 are directly secured to the enclosure 202, cold spots on the enclosure 202 are avoided. Whenever clips are attached to the enclosure, such as shown in FIG. 1, the enclosure is susceptible to cold spots where the clips are connected. By virtue of the embodiment of FIGS. 16 and 17, any cold spot between the electrical connector 218 and the plug portion 216 is far removed from the enclosure 202. Thus, the point of connection prevents the enclosure 202 from being cooled by cold leads of clamps.

FIGS. 18 through 20 illustrate another alternative embodiment of the invention. In this instance, the invention is in the form of a clip 224 having separable jaws 226 and 228 joined by a hinge 230 and normally spring biased in a closed position.

Each jaw 226 and 228 has an insulator 232 suitably secured to the jaw. A conductor 234 is mounted in each jaw 226 and 228 against the insulators 232, the conductors 234 being maintained out of direct electrical contact by means of a pair of butting separators 236 attached to the insulators 232 of the respective jaws 226 and 228. A wire 238 is secured to each of the conductors 234 and extends through the clip 224 to an appropriate source of heating current (not illustrated). The wires 238 and conductors 234 may be secured to the respective jaws 226 and 228 by means of a series of clampable fasteners 240 or by any other appropriate method of securing such parts together.

One of the conductors 234 is shown in an exploded fashion in FIG. 20. As illustrated, the conductor 234 is composed of a series of conducting layers 242 with an insulant 244, such as mica, separating each layer. The layers 242 are interconnected as opposite ends so that heating current flows through the conductor in a serpentine fashion. Thus, not only does the conductor 234 provide a direct electrical contact to an object to be heated, but also, due to the layered nature of the conductor 234, when electrical current flows through the conductor, the conductor is heated. Thus, the conductor 234 will heat an object secured between the jaws 226 and 228 in two fashions, by heat conduction from the heated conductor 234, and by electrical resistance heating from passing of heating current directly to the clamped object.

A thermocouple 246 having wires 248 leading to a meter (not illustrated) is used to measure the temperature of the object being heated. The thermocouple 246 may be secured to the underside of the conductor 234, as illustrated in FIG. 20, or, if desired, it may be secured to the top of the conductor 234 in order to directly contact the heated object whose temperature is to be detected.

Each of the insulators 232 can include a depression 250 so that when an object is clamped between the jaws 226 and 228, the conductors 234 have deformed to conform to the shape of the object clamped therebetween. The conductors would be deformed into the depressions 250.

In the embodiments of FIGS. 16 and 17 and FIGS. 18 through 20, heating of the object whose temperature is to be determined is accomplished in two means. First, since the enclosure 202 (FIGS. 16 and 17) or the conductors 234 (FIGS. 18 through 20) are themselves heated, heat is passed to the object by molecular interaction and the object is therefore heated by conduction. In addition, the enclosure 202 and conductors 234 pass electrical heating current directly to the object to be heated, thereby causing the object to also be heated by resistance heating through the flow of electrons through the object whose temperature is to be determined.

It will be apparent from the foregoing that a novel and useful instrument for inducing heat into an object has been provided. The instrument is readily adaptable to a variety of different object sizes and shapes, particularly elongated objects such as thermometer bulbs and Calrod heating elements. The instrument includes a self-contained heating arrangement for inducing heat into the object to be tested and means for accurately obtaining the temperature of the object. The instrument is further advantageous in that it uniformly heats the object in the critical areas where the temperature is to be measured in order to obtain an accurate temperature measurement. The instrument may be used to heat the entire length of an elongated thermometer bulb in order to make an accurate test of the instrument. Further, whereas the forms of the instrument described herein utilize resistance heating, an arrangement may also be provided that utilizes induction heating. In the arrangement shown in FIG. 13, the thermocouple wires may instead be arranged to directly contact the object to be tested by spreading some of the coils apart to enable the thermocouple wires to be placed in direct engagement with the object without materially changing the effectiveness of the enclosure.

Various changes can be made to the invention without departing from the spirit thereof or scope of the following claims.

I claim:

1. An instrument for inducing heat into an elongated object whose temperature is to be measured, comprising heating means formed to be fastened to and at least partially enclose a portion of the object whose temperature is to be measured, power terminal means fastened to said heating means, a power supply connected to said power terminal means for supplying heating current to said terminal means and to said heating means, said heating means having means to contact said object for permitting conduction of heat directly to and along a predetermined portion of said object thereby heating said heating means and said object, and thermocouple means for sensing the temperature of said object, said thermocouple means being located adjacent said object and being connected to means for providing an indication of the measured temperature of said object.

2. Apparatus as in claim 1, wherein said heating current flows through said heating means and said object, and heats said heating means and said object by resistance heating.

3. Apparatus as in claim 1, wherein said heating means comprises an enclosure having an opening therein and said thermocouple means extends through said opening and into engagement with the object.

4. Apparatus as in claim 1, wherein said thermocouple means is fastened to and senses the temperature of said heating means.

5. Apparatus as in claim 1, wherein said heating means comprises an enclosure and said thermocouple means comprises thermocouple wires fastened at spaced locations to said enclosure, and the portion of said enclosure means between said locations forms part of said thermocouple means.

6. Apparatus as in claim 1, wherein said heating means is adapted to be clipped on to an elongated object.

7. Apparatus as in claim 6, wherein said heating means comprises a generally U-shaped enclosure and said power terminal means is fastened to the end portions of said enclosure.

8. Apparatus as in claim 1, wherein said heating means comprises at least two clips formed to be fastened to said object.

9. Apparatus as in claim 8, wherein one of said clips includes two movable jaws, and one of said jaws has said thermocouple means mounted thereon.

10. Apparatus as in claim 9, wherein said one jaw has a heat dam formed therein closely adjacent said thermocouple means.

11. Apparatus as in claim 9, wherein said jaws of said one clip include layers of insulation engaging said object.

12. Apparatus as in claim 1, wherein said heating means comprises at least one clip formed to be fastened to said object.

13. Apparatus as in claim 12, wherein said clip includes moveable jaws, each of said jaws having a said electrical contact mounted therein, said contacts being maintained separate from one another.

14. Apparatus as in claim 13, wherein each said contact comprises a layered conductor with an insulant separating each layer, said layers being interconnected at opposite ends such that the heating current flows through said conductor in a serpentine fashion.

15. Apparatus as in claim 1, wherein said heating means is formed by halves on opposite sides of said object, and clamps for pressing said halves into engagement with said object.

16. Apparatus as in claim 15, and further including insulation means between said halves and said clamps.

17. Apparatus as in claim 1, wherein said power supply comprises a step-down voltage transformer having a primary winding and a secondary winding, said primary winding being adapted to be connected to an AC power source and said secondary winding being connected to said power terminal means, whereby said transformer forms a low voltage, high current output isolation transformer.

18. Apparatus as in claim 1, wherein said heating current flows through said heating means and heats said heating means by resistance heating and said object by means other than resistance heating.

19. An instrument for heating and measuring the temperature of an elongated object, comprising an elongated enclosure that is generally U-shaped in cross section and formed to be clipped onto said object, power supply means connected to the end portions of said enclosure for passing heating current through said enclosure, said enclosure having a contact for permitting conduction of heating current directly to and along a predetermined portion of said object, and thermocouple means mounted at approximately the center of said enclosure.

20. An instrument as in claim 19, wherein a hole is formed through the wall of said enclosure means, and said thermocouple means extends through said hole.

* * * * *